United States Patent [19]

Just et al.

[11] Patent Number: 5,033,514

[45] Date of Patent: Jul. 23, 1991

[54] FIBER REINFORCED PLASTIC ACCELERATING LEVER FOR A PROJECTILE LOOM

[75] Inventors: Christian Just, Elgg; Jochen Muller, Oerlingen; Andreas Hunziker, Nanikon, all of Switzerland

[73] Assignee: Sulzer Brothers Limited, Winterthur, Switzerland

[21] Appl. No.: 510,957

[22] Filed: Apr. 19, 1990

[30] Foreign Application Priority Data

May 16, 1989 [CH] Switzerland ............... 01820/89

[51] Int. Cl.$^5$ ........................................ D03D 49/26
[52] U.S. Cl. ........................... 139/145; 74/519; 428/112; 428/113; 428/408; 403/368; 403/374
[58] Field of Search ............... 74/519, 579 E, 579 R; 139/1 R, 145, 157, 449; 123/197 R, 197 AB, 197 AC; 428/112, 113, 408; 403/368, 374; 92/187

[56] References Cited

U.S. PATENT DOCUMENTS

| | | | |
|---|---|---|---|
| 3,826,155 | 7/1974 | Muller | 74/519 |
| 4,367,053 | 1/1983 | Stratienko et al. | 403/374 |
| 4,403,525 | 9/1983 | Bongers . | |
| 4,438,738 | 3/1984 | Kosuda et al. | 74/519 |
| 4,541,304 | 9/1985 | Chikugo et al. | 123/197 AB |
| 4,546,669 | 10/1985 | Fischer et al. | 74/579 R |
| 4,635,684 | 1/1987 | Hintsch | 139/1 R |
| 4,783,052 | 11/1988 | Walden | 251/368 |
| 4,820,568 | 4/1989 | Harpell et al. | 428/113 |
| 4,922,967 | 5/1990 | Pfarrwaller et al. | 139/145 |

FOREIGN PATENT DOCUMENTS

| | | |
|---|---|---|
| 0001563 | 5/1979 | European Pat. Off. . |
| 0031413 | 7/1981 | European Pat. Off. . |
| 3317046 | 11/1984 | Fed. Rep. of Germany . |
| 2184613 | 12/1973 | France . |
| 0349231 | 11/1960 | Switzerland . |
| 0597395 | 4/1978 | Switzerland . |

*Primary Examiner*—Andrew M. Falik
*Attorney, Agent, or Firm*—Kenyon & Kenyon

[57] ABSTRACT

The low-inertia and high-strength accelerating lever comprises a hub part, arm and end part made of a thermoplastics reinforced by high-strength fibers. The lever is built up from a number of layers in the form a Prepregs or semifinisheds, which are placed one on another, the layers having different fiber orientations and extending substantially parallel to the movement plane. Longitudinal components of the fiber orientations predominate in the arm with a gradual transition to the hub part and end part; the hub part and end part having a substantially isotropic distribution of the fiber orientations.

21 Claims, 5 Drawing Sheets

FIBER REINFORCED PLASTIC ACCELERATING LEVER FOR A PROJECTILE LOOM

This invention relates to a lightweight-mechanical-strength accelerating lever. More particularly, this invention relates to an accelerating lever for a projectile loom.

As is known, various types of accelerating levers or picking levers have been known for the picking of projectiles in a projectile loom. Generally, accelerating levers or picking levers of this type have been made of high-strength steel or titanium. However, metal picking levers are relatively heavy, consume considerable power and limit loom output.

It has also been known from Swiss Patent 553,864 and U.S. Pat. No. 3,826,155 to construct a relatively lightweight picking lever with an arm of fiber-reinforced thermosetting plastic. In this case, the lever has been comprised of a fiber loop which provides the necessary strength and which is wound around the lever arm periphery. However, the hub part of this construction is still made of relatively heavy metal. Such an arm is elaborate, costly and slow to produce. Also, the mechanical strength and impact resistance of the lever are so limited as to make the lever unusable in a series-produced article in high performance looms.

Other types of structures have also been known wherein synthetic materials have been disposed in a loop about parts defining a hub and an end part, for example, as described in German O.S. 3317046; European Patent Application 0031413 and corresponding U.S. Pat. No. 4,403,525.

Still further, various types of techniques have been known for the build up of composite structures as described in European Patent Application 0001563; Swiss Patent 597,395 and Swiss patent 349,231.

Accordingly, it is an object of the invention to provide an accelerating lever of relatively reduced inertia as regards rotation around a hub but of unimpaired strength and impact resistance.

It is another object of the invention to provide a lightweight accelerating lever which has high durability and which is simple and inexpensive to produce.

It is another object of the invention to provide an accelerating lever of plastic laminated construction which has high durability without delamination.

Briefly, the invention provides an accelerating lever which is comprised of a plurality of laminations of fiber-reinforced plastic disposed in overlying relation to define a hub part, an arm extending from the hub part along a longitudinal axis and an end part connected to the arm. Each lamination has a plurality of parallel fibers (or filaments) with the fibers of at least some of the laminations being disposed in angular relation to the fibers of a contiguous lamination.

The lever is particularly useful as a picking lever to accelerate the projectiles of a projectile loom and to facilitate higher projectile speed and, therefore, improved outputs.

According to the invention, therefore, the hub part, arm and end part are made of high-strength-fiber-reinforced thermoplastics built up from a number of layers (laminations) one above another in the form of Prepregs or semifinisheds, the layers also have different fiber orientations with the longitudinal components of the fiber orientations predominating in the arm with a gradual transition to the hub part and to the end zone which have a substantially isotropic distribution of the fiber orientations.

The laminated construction of thermoplastic Prepregs having different fiber orientations ensures in all the parts (hub, arm and end part) optimal adaptation on of mechanical strength of the laminate to the respective directions of loading and substantially greater impact strength and durability than is provided by the known thermosetting plastics. The lever therefore possesses, simultaneously, a weight reduction and greater mechanical strength, relative to previously known levers. Also the simple construction of the layers one above another substantially parallel to the movement plane of the lever simplifies and therefore cheapens manufacture as compared with the conventional technology using wound thermosetting laminates. Since the tedious step conventionally necessary of polymerization of the thermosetting plastics is omitted, not only does production become more accurately reproducible and of a higher and constant quality but also cycle times are reduced considerably and so for the first time production in a long series becomes possible.

The laminations of the lever may be made up of any suitable fibers, for example endless carbon fibers while the plastic is made of a thermoplastic such as polyetheretherketone (PEEK) or polyphenylesulfide (PRS). Further, each layer of undirectional structures has at least a 50% by volume fiber component to provide maximum specific strengths and minimum inertia.

The end part of the lever may also be provided with an eye for rotatably receiving a pin of a connecting part therein. In this case, the composite material itself is effective as a bearing and thus renders the need for a relatively heavy hard metal bearing liner unnecessary. Further the eye may be offset from the central axis (longitudinal axis) of the arm and end part.

One result of the arrangement of the fiber orientation is that some fibers are always disposed perpendicularly to the bore surface of the eye so that self-lubrication is achieved and the lubricants conventionally necessary become superfluous.

In one embodiment, a small wear-resistant picking element may be mounted on the end part so that the lever can be used to pick a projectile directly without a separate picking element connected to the eye.

The arm may be constructed of any suitable shape, for example, the arm may be of flat shape, of curved shape or of shell shaped. Otherwise, the arm may be tapered between the hub and end part or may be cylindrical. Still further, where particularly great rigidity is required, the arm may be of box-section.

In order to provide for a simple and easy form of securing the lever to a support structure, such as a shaft, use may be made of a tapered ring disposed in the hub part for securing the lever to a shaft. Alternatively, a conical disk may be disposed adjacent the hub part for mounting on a flanged cylindrical hub.

These and other objects and advantages of the invention will become more apparent from the following detailed description taken in conjunction with the accompanying drawings wherein:

FIG. 1d illustrates a view taken on line C—C of FIG. 1a;

FIG. 1f graphically illustrates the fiber orientation within a lamination of the hub part of the lever of FIG. 1a;

Figure 1A:
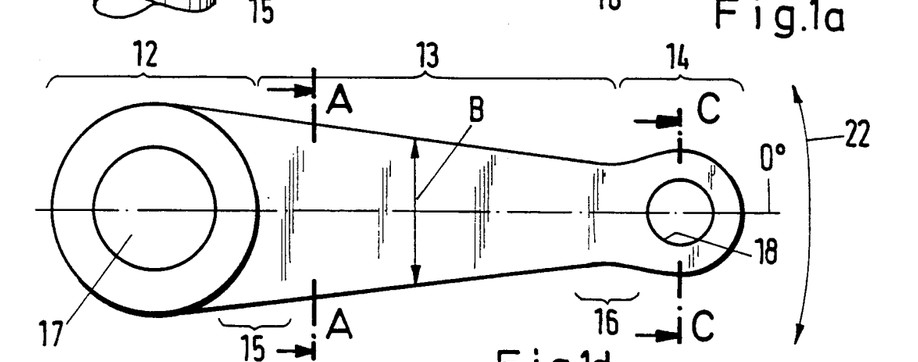
FIG. 1a illustrates a plan view of a lever constructed in accordance with the invention.
Figure 1B:
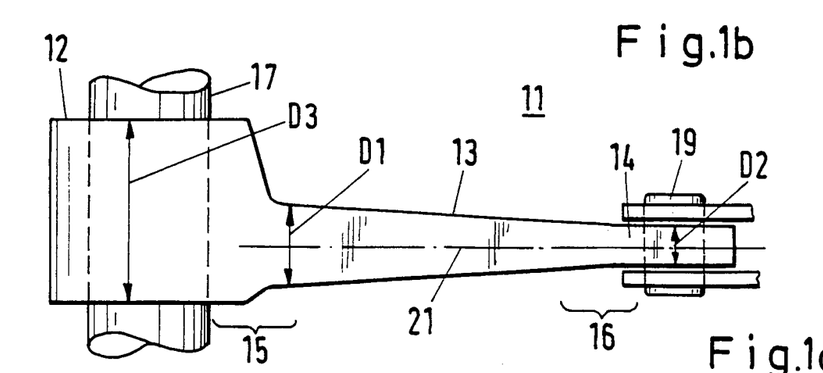
FIG. 1b illustrates a side view of the lever of FIG. 1a on a shaft.

Referring to FIGS. 1a and 1b, the accelerating lever 11 is formed of a hub part 12, an arm 13 extending from the upper part 12 and an end part 14 extending from the arm 13. The lever 11 is of lightweight and high-mechanical strength. As indicated, the hub part 12 is mounted on a drive shaft 17, for example for pivoting the lever 11 in a direction indicated by the arrow 22 in FIG. 1a. Further, the lever 11 is constructed in a symmetrical manner about a central longitudinal plane 21 as shown in FIG. 1a while being pivotable with the shaft 17 in the central plane 21 (see FIG. 1b). Thus, the plane 21 is also the plane of symmetry of the lever 11.

Figure 1C:
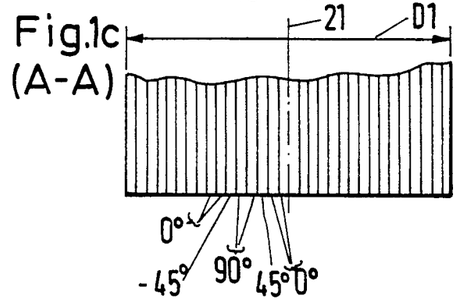
FIG. 1c illustrates a view taken on line A—A of FIG. 1a to illustrate the laminated construction of the lever in accordance with the invention.
Figure 1D:
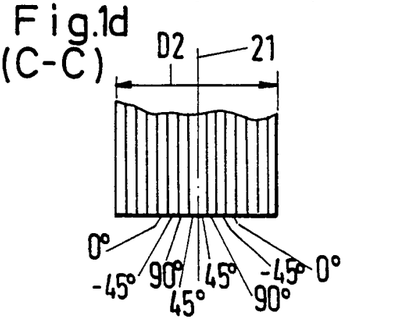
Figure 1E:
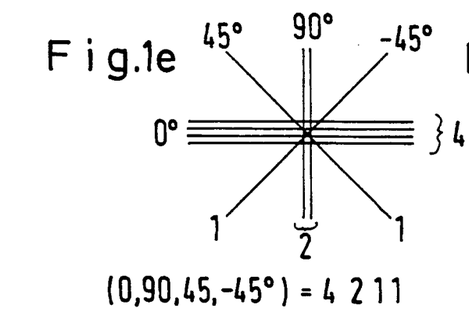
FIG. 1e graphically illustrates the fiber orientation within consecutive layers within a lamination of the arm in accordance with the invention.
Figure 1F:
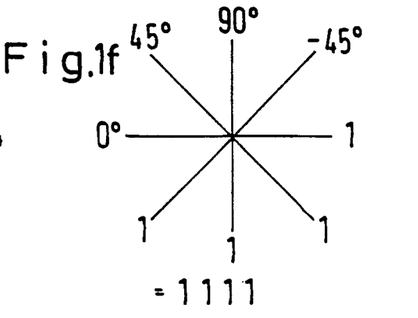

FIGS. 1c to 1f are cross-sections of the arm 13 and end part 14 which show the construction and fiber orientations of the various layers used to build up the lever 11. The layers are disposed symmetrically of and substantially parallel to the movement plane 21. The fiber orientations of the layers extend in the direction 0°, 90°, 45°, −45° in the plane 21. The longitudinal components (0° direction) predominate in the arm 13 with a layer distribution of (0°, 90°, 45°, −45°)=4211—i.e., four layers in the 0° direction, two layers in the 90° direction and one layer each in the 45° and −45° directions form a layer period (FIGS. 1c and 1e). However, in the end part 14 with the eye 18, the distribution of the fiber orientations is approximately isotropic, being (0°, 90°, 45°, −45°)=1111—i.e., always one layer in each direction, consecutive layers always being offset from one another by 45°—i.e., from the plane of symmetry 21 the orientations are 0°, 45°, 90°, −45°, 0°. This period is repeated a number of times until the required optimal lever thickness D is obtained. For optimal shaping to deal with stressing, the lever 11 narrows towards the eye 18 both in its width B and in its thickness D. With a relatively reduced thickness of the individual layers of preferably 0.1 to 0.3 millimeters (mm)—i.e., e.g. 0.2 mm—and lever thicknesses of D1=8, D2=4 and D3=30, there are correspondingly 40, 20 and 150 individual layers at the corresponding places. This relatively large number of individual layers provides a uniform and continuous optimal distribution of the mechanical properties of the complete fiber composition. The problem of local weak spots and delaminations is therefore overcome.

The hub part 12 is also built up substantially isotropically, like the end part 14, with (0°, 90°, 45°, −45°) =1 1 1 1 but is a considerably greater thickness D3. In the transition zones 15 between the arm 13 and the hub part 12 and between the arm 12 and the end part 14 there is a gradual transition of the layer structure from 4 2 1 1 to 1 1 1 1— i.e., for example, by way of the intermediate stages 3 2 1 1, 2 2 1 1 and 2 1 1 1.

The layers of the lever are made of a thermoplastic selected from the group consisting of PEEK and PPS with each layer having at least a 50% by volume fiber content.

Figure 2:
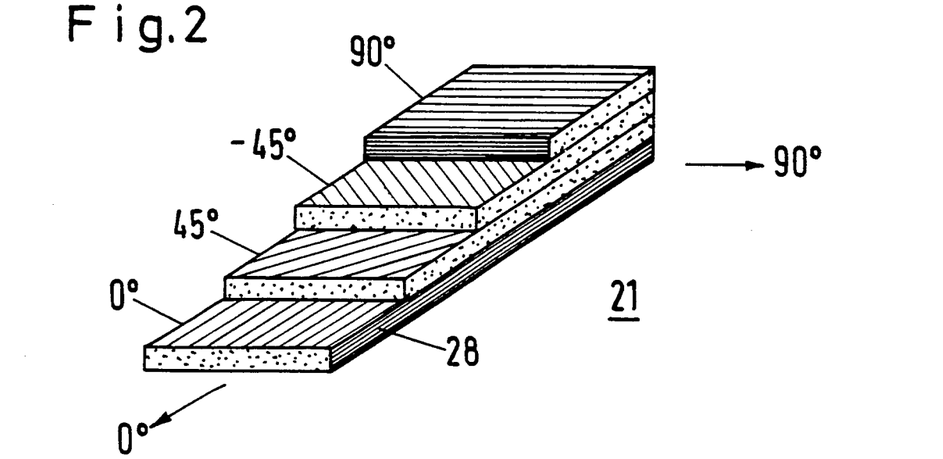
FIG. 2 illustrates a laminate construction having different fiber orientations in accordance with the invention.

FIG. 2 is a perspective view of an example of a layer build-up which is parallel to the plane 21 and in which there is periodically one layer each in the 0°, 45°, −45° and 90° directions.

An accelerating lever can be manufactured in the following simple way:

Cutting to shape and building up the discrete layers in optimal shape, number, fiber orientations and sequence of fiber-reinforced thermoplastics Prepregs or semifinisheds;

Heating;

Plastic deformation with pressure in a press and brief cooling;

Removal from mold and any further treatment cold, treatment involving chip removal being possible.

This form of production facilitates short cycle times and therefore relatively long production runs.

Figure 3:
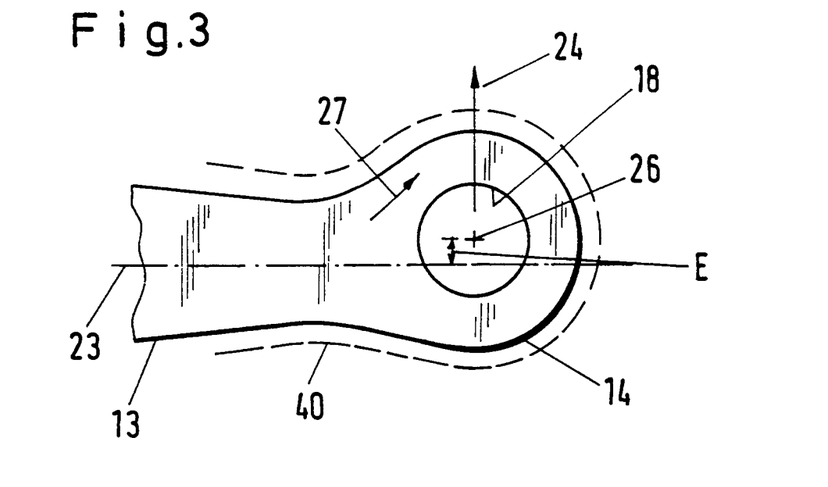
FIG. 3 illustrates a modified end part of a lever in accordance with the invention.

Referring to FIG. 3, the end part 14 of an accelerating lever may have an eye center 26 offset from the arm center plane 23 by an amount E in the direction 24 of the main stressing. Consequently, the most heavily stressed parts of the lever can experience tension (27) and not pressure. The tensile strength of the fiber-reinforced thermoplastics is greater than their compressive strength.

Figures 4, 5:
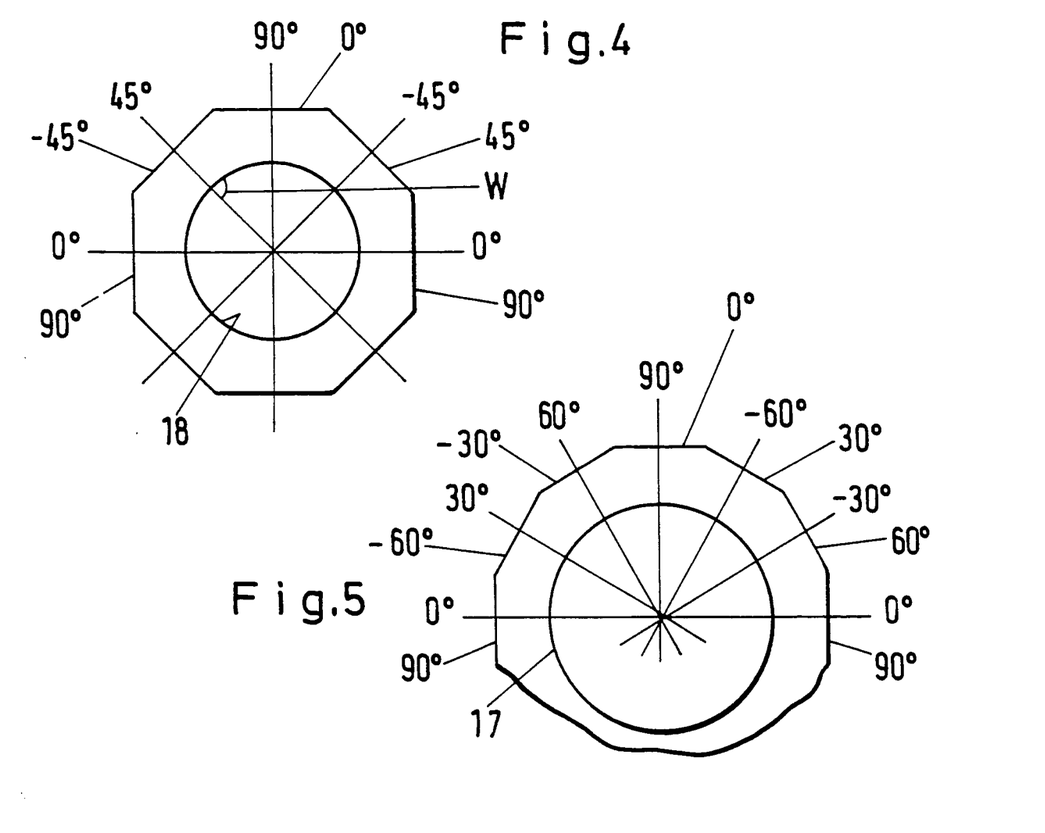
FIG. 4 illustrates a polygonal arrangement of the fiber orientations of a layer of a lever constructed in accordance with the invention.
FIG. 5 illustrates a modified polygonal arrangement of the fibers in accordance with the invention.

FIGS. 4 and 5 show examples of polygonal arrangements of the layer fiber orientations. In FIG. 4 the change of angle of fiber orientation from any layer to the next is 45°, corresponding to an octagon. In FIG. 5, the change of angle is 30°, corresponding to a duodecagon. In the isotropic zones of the end part with eye and hub part with one layer each in each direction, the orientations according to FIG. 4 are 0°, 45°, 90°, −45° and the number of layers is 1 1 1 1 and, according to FIG. 5, there are Orientations of 0°, 30°, 60°, 90°, −60°, −30° and the number of layers is 1 1 1 1 1 1.

In the zone of the arm 13, where the longitudinal components predominate in the 0° direction there are, for example (0°, 30°, 60°, 90°, −60°, −30°)=6 1 1 2 1 1 layers i.e. a non-isotropic distribution of fiber orientations. The sequence in the build-up of a layer period can be, in this case, 0° twice, 30° once, 60° once, 90° twice, 0° twice, −60° once and −30° once. As will be apparent from the drawings, these layer arrangements form a polygonal approximation of fiber orientations to the circular shape of the eye 18 in the end zone and of the shaft 17 in the hub part. Consequently, the elaborate and difficult fiber loop 40 previously necessary in wound thermosetting plastics levers (chain line in FIG. 3) is replaced in a simple manner and with improved mechanical properties. An additional and very important advantage of the laminated construction is that there is always a proportion of the fiber which extends substantially perpendicularly at an angle W to the surface of the eye 18. These fibers, more particularly in the case of a carbon fiber reinforcement, also provide the necessary long-life lubrication in the eye 18 for a pin 19 rotatable therein. The omission of the previously necessary hard metal lining in the end part and of lubrication reduces the deadweight and servicing costs.

Figure 6:
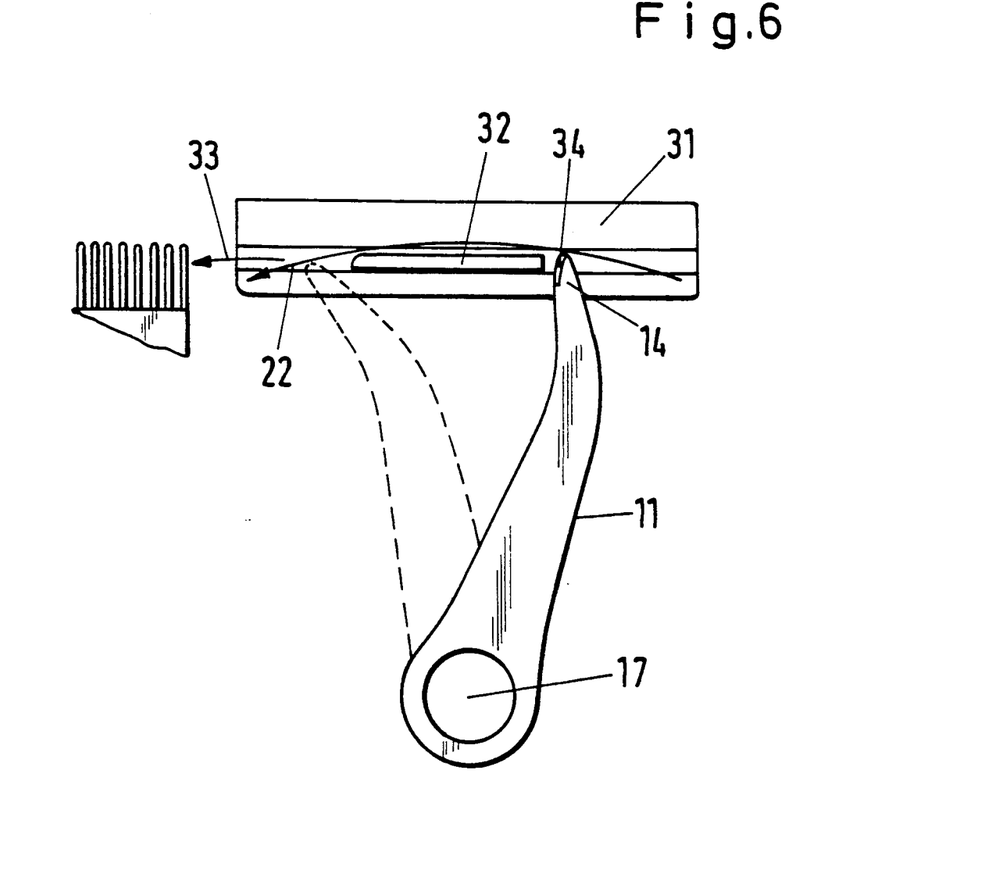
FIG. 6 illustrates a lever having a wear resistant picking element for picking a projectile in a loom.

FIG. 6 shows an accelerating lever used as a picking lever in a projectile loom, the projectile being shot directly without the use of a separately mounted picking element. To this end, a wear-resistant picking element 34, for example, a hard metal tip or the like, is fitted directly in the end zone 14. When the shaft 17 actuates the lever 11, the integrated picking element 34 accelerates the projectile 32 along a guide 31 in a direction 33 towards the shed. Loom performance can therefore be further improved while power consumption and noise can be reduced considerably.

FIGS. 7a to 7d show various possible embodiments of arms 13 for accelerating levers. For optimal adaptation to given mechanical stresses, the arm can be devised with a slight narrowing or taper 36, a flat conical shape 37 or a shell-like conical shape 38 or can have a cylindrical cross-section 39.

Figure 7A:
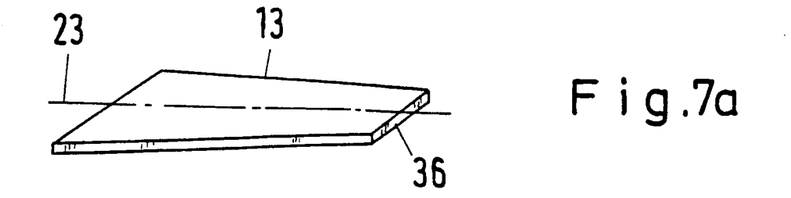
FIG. 7a illustrates a geometric form of the arm of a lever in accordance with the invention.
Figure 7B:
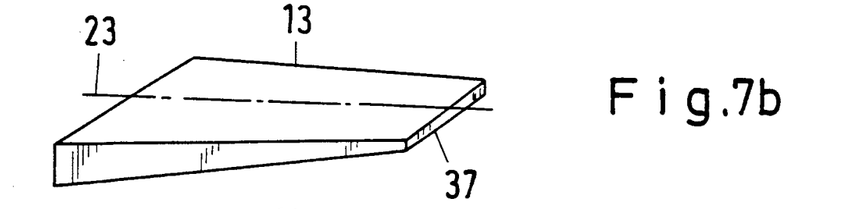
FIG. 7b illustrates a modified shape for the arm of a lever constructed in accordance with the invention.
Figures 7C, 7D, 8A, 8B:
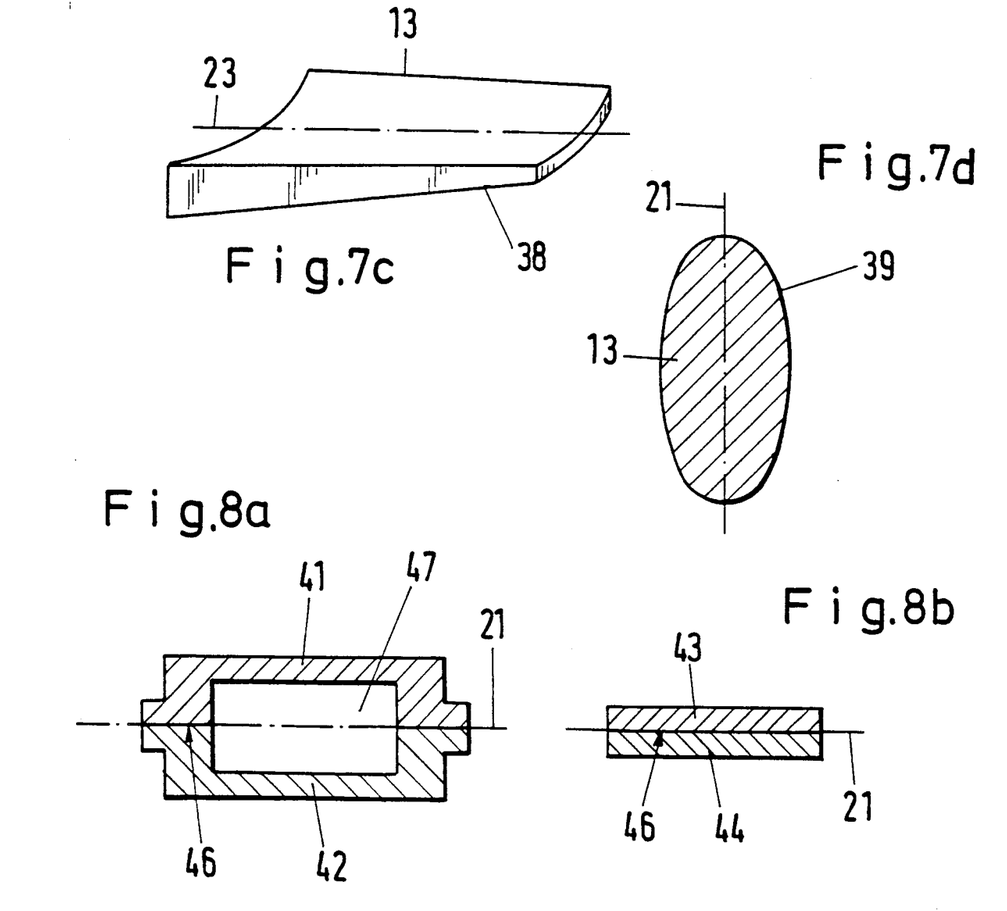
FIG. 7c illustrates a shell like arm for a lever in accordance with the invention.
FIG. 7d illustrates a rounded cross section of a lever arm in accordance with the invention.
FIG. 8a illustrates a cross-sectional view of a box-section lever constructed in accordance with the invention.
FIG. 8b illustrates a cross-section of a hub part of a lever having an arm of box-section in accordance with the invention.

Referring to FIGS. 8a and 8b a very rigid and lightweight accelerating lever can be provided by a box-like construction combined, for example, from two half-shells 41, 42 which bound a hollow 47 in the arm zone which disappears in the eye zone where the half shells 43, 44 form a solid cross-section. The thermoplastic half-shells 41–44 can be welded together in a simple and reliable manner by way of the boundary surfaces 46, for example, by butt-Welding with mirrors. To damp vibrations or to improve rigidity the hollow 47 can be filed with a light filling material such as elastic foam substances or with a honeycomb structure.

Figure 9:
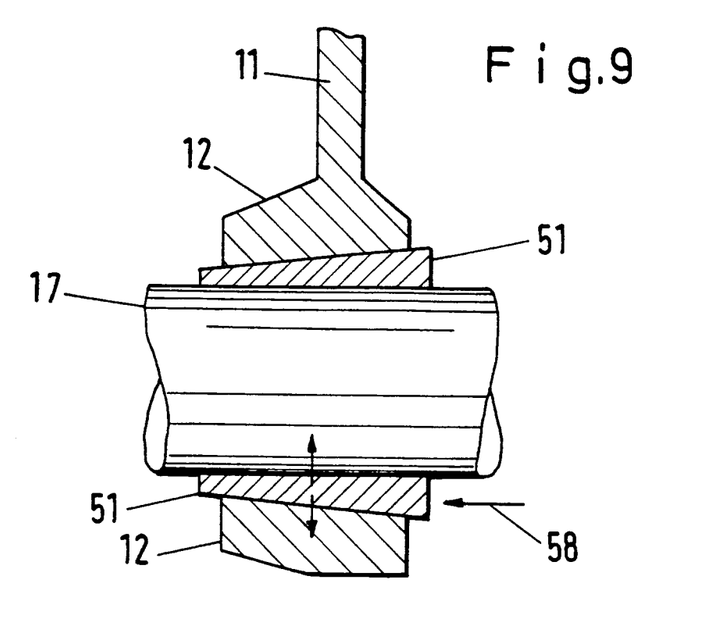
FIG. 9 illustrates use of a tapered ring for mounting a lever on a shaft.

FIG. 9 shows a radial securing of the hub part 12 of the lever 11 via a ring 51 for a non-slip securing of the lever 11 on the shaft 17 by means of friction. To locate the lever 11 in the required position, the ring 51 is moved in the clamping direction 58 by a detachable fitting device (not shown), for example, by means of compression produced by oil pressure. This provides a very lightweight securement.

Figure 10A:
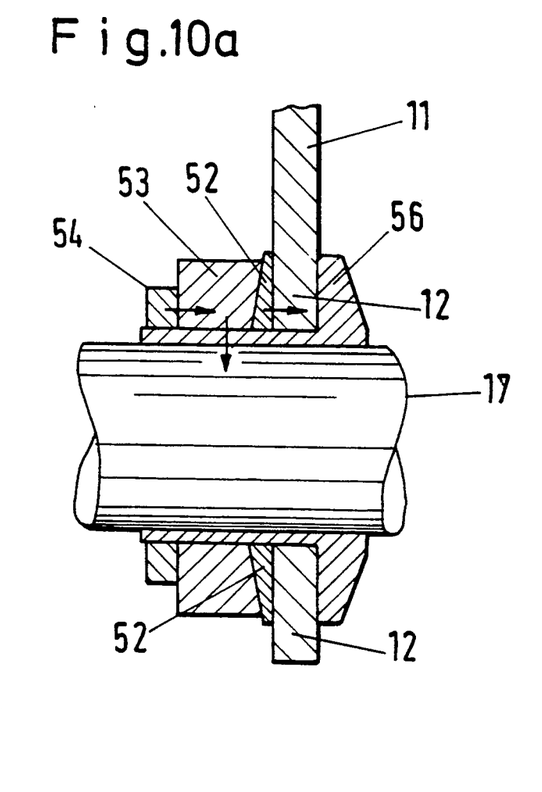
FIG. 10a illustrates a modified mounting arrangement employing a conical disk for mounting a lever on a flanged cylindrical hub.
Figure 10B:
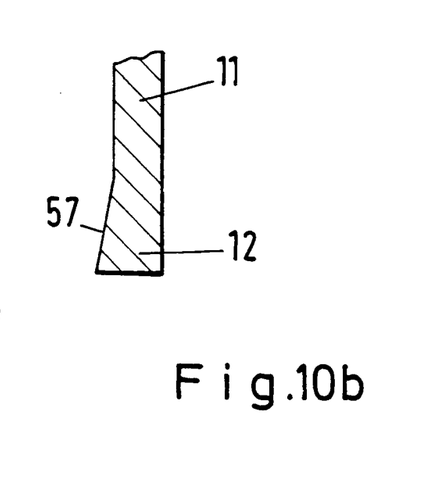
FIG. 10b illustrates a modified lever having an integral conical mounting portion.

FIG. 10a shows an axial securing of the hub part 12 by means of a conical disk 52. By means of a pressing nut 54 and clamping ring 53, the lever 11, which bears on a flanged cylindrical pressing hub 56, and the pressing hub itself are secured and retained on the shaft 17 by friction. In a simplified version, the disk 52 can be formed by means of appropriate shaping an integral conical part 57 {see FIG. 10b} on the hub part 12 of the lever 11.

The invention thus provides an accelerating lever of lightweight laminated construction which possesses high mechanical strength. Further, the invention provides an accelerating lever for a loom which is of simple construction which can be produced at relatively low costs.

Further, the invention provides an accelerating lever which has high impact resistance and high durability.

Further, the lever may be used as a picking lever in a projectile loom as a means of improving loom performance and reducing energy consumption.

What is claimed is:

1. A light weight high-mechanical strength accelerating lever for a loom comprising
   a hub part having a plurality of parallel layers of fiber-reinforced plastic, each layer having a plurality of parallel fibers with the fibers of at least some layers being disposed in angular relation to the fibers of a contiguous layer;
   an arm extending from said hub part and having a plurality of parallel layers of fiber-reinforced plastic of a different number from said layers of said hub part, each said layer of said arm having a plurality of parallel fibers with the fibers of at least some layers being disposed in angular relation to the fibers of a contiguous layer in said arm; and
   an end part extending from said arm and having a plurality of parallel layers of fiber-reinforced plastic, each said layer of said end part having a plurality of parallel fibers with the fibers of at least some layers being disposed in angular relation to the fibers of a contiguous layer in said end part.

2. A lever as set forth in claim 1 wherein said layers in said hub part and said end part have an isotropic distribution of fiber orientations and said layers in said arm part have a non-isotropic distribution of fiber orientations.

3. A lever as set forth in claim 1 wherein the orientation of said fibers of said layers of said hub part, arm and end part are disposed alternately and symmetrically of a center plane.

4. A lever as set forth in claim 1 wherein said fibers are endless carbon fibers.

5. A lever as set forth in claim 1 wherein each layer has at least a 50% by volume fiber component.

6. A lever as set forth in claim 1 wherein each said layer is made of a thermoplastic selected from the group consisting of PEEK and PPS.

7. A lever as set forth in claim 1 wherein said end part has an eye for rotatably receiving a pin therein.

8. A lever as set forth in claim 1 which further comprises a wear-resistant picking element mounted on said end part.

9. A lever as set forth in claim 1 wherein said arm is of a shape selected from the group consisting of a flat shape, a curved shape and a shell shape.

10. A lever as set forth in claim 9 wherein said arm is tapered between said hub and said end part.

11. A lever as set forth in claim 1 wherein said arm is of box-section.

12. A lever as set forth in claim 1 wherein each layer is of a thickness of at most 0.3 millimeters.

13. A lever as set forth in claim 1 wherein the fiber orientations of contiguous layers are in angular relation to each other.

14. A lever as set forth in claim 13, wherein said fiber orientations of contiguous layers are in polygonal relation to each other.

15. An accelerating lever for a loom comprising a plurality of laminations of fiber-reinforced plastic disposed in overlying relation to define a hub part, an arm extending from said hub part along a longitudinal axis and an end part connected to said arm with said hub part having a greater number of laminations than said arm;

each said lamination having a plurality of parallel fibers with the fibers of at least some of said laminations being disposed in angular relation to the fibers of a contiguous lamination.

16. A lever as set forth in claim 15 wherein said laminations of said hub part and said end part have an isotropic distribution of fiber orientations.

17. In combination a lever having a plurality of laminations of fiber-reinforced plastic disposed in overlying relation to define a hub part of a predetermined thickness, an arm extending from said hub part along a longitudinal axis and an end part connected to said arm of a thickness less than said thickness of said hub part;

each said lamination having a plurality of parallel fibers with the fibers of at least some of said laminations being disposed in angular relation to the fibers of a contiguous lamination; and a tapered ring disposed in said hub part for securing said lever to a shaft.

18. In combination a lever having a plurality of laminations of fiber-reinforced plastic disposed in overlying relation to define a hub part of a predetermined thickness, an arm extending from said hub part along a longitudinal axis and an end part connected to said arm of a thickness less than said thickness of said hub part;

each said lamination having a plurality of parallel fibers with the fibers of at least some of said laminations being disposed in angular relation to the fibers of a contiguous lamination; and a conical disk adjacent said hub part for mounting on a flanged cylindrical hub.

19. A light weight high-mechanical strength accelerating lever for a loom comprising a hub part having a plurality of parallel layers of fiber-reinforced plastic, each layer having a plurality of parallel fibers with the fibers of at least some layers being disposed in angular relation to the fibers of a contiguous layer;

an arm extending from said hub part and having a plurality of parallel layers of fiber-reinforced plastic, each said layer of said arm having a plurality of parallel fibers with the fibers of at least some layers being disposed in angular relation to the fibers of a contiguous layer in said arm; and an end part extending from said arm and having a plurality of parallel layers of fiber-reinforced plastic, each said layer of said end part having a plurality of parallel fibers with the fibers of at least some layers being disposed in angular relation to the fibers of a contiguous layer in said end part, said end part having an eye offset from a central axis of said arm and said end part for rotatably receiving a pin.

20. A light weight high-mechanical strength accelerating lever for a loom comprising a hub part having a plurality of parallel layers of fiber-reinforced plastic, each layer having a plurality of parallel fibers with the fibers of at least some layers being disposed in angular relation to the fibers of a contiguous layer;

an arm of box-section extending from said hub part and having a plurality of parallel layers of fiber-reinforced plastic, each said layer of said arm having a plurality of parallel fibers with the fibers of at least some layers being disposed in angular relation to the fibers of a contiguous layer in said arm; and an end part extending from said arm and having a plurality of parallel layers of fiber-reinforced plastic, each said layer of said end part having a plurality of parallel fibers with the fibers of at least some layers being disposed in angular relation to the fibers of a contiguous layer in said end part.

21. A light weight high-mechanical strength accelerating lever for a loom comprising a hub part having a plurality of parallel layers of fiber-reinforced plastic of a thickness of at most 0.3 millimeters, each layer having a plurality of parallel fibers with the fibers of at least some layers being disposed in angular relation to the fibers of a contiguous layer;

an arm extending from said hub part and having a plurality of parallel layers of fiber-reinforced plastic, of a thickness of at most 0.3 millimeters, each said layer of said arm having a plurality of parallel fibers with the fibers of at least some layers being disposed in angular relation to the fibers of a contiguous layer in said arm; and an end part extending from said arm and having a plurality of parallel layers of fiber-reinforced plastic of a thickness of at most 0.3 millimeters, each said layer of said end part having a plurality of parallel fibers with the fibers of at least some layers being disposed in angular relation to the fibers of a contiguous layer in said end part.

* * * * *

UNITED STATES PATENT AND TRADEMARK OFFICE
CERTIFICATE OF CORRECTION

PATENT NO. : 5,033,514

DATED : July 23, 1991

INVENTOR(S) : CHRISTIAN JUST, et al

It is certified that error appears in the above-identified patent and that said Letters Patent is hereby corrected as shown below:

```
In the Abstract, line 4 change "form a" to -form of a-
Column 2, line 5 cancel "on"
Column 2, line 26 change "polyphenylesvlfide" to -polyphenylenesulfide-
Column 2, line 26 change "(PRS)" to -(PPS)-
Column 2, line 48 change "shaped." to -shape.-
Column 4 line 63 change "Orientations" to -orientations-
Column 5, line 46 change "Welding" to -welding-
Column 5, line 47 change "filed" to -filled-
Column 5, line 64 change "shaping an" to -shaping of an-
```

Signed and Sealed this

Ninth Day of February, 1993

Attest:

STEPHEN G. KUNIN

Attesting Officer

Acting Commissioner of Patents and Trademarks